3,467,701
ISOLATION OF OXIDATION PRODUCTS
OF CYCLOHEXANE
Alan Pounder and William Frederick Sykens, Manchester, England, assignors to Imperial Chemical Industries Limited, London, England, a corporation of Great Britain
No Drawing. Filed Apr. 4, 1966, Ser. No. 539,627
Claims priority, application Great Britain, Apr. 28, 1965, 17,896/65
Int. Cl. C07c 55/14, 51/18
U.S. Cl. 260—533
3 Claims

ABSTRACT OF THE DISCLOSURE

A process for the manufacture of adipic acid by oxidizing cyclohexane in liquid phase at elevated temperature and pressure, with a gas containing molecular oxygen and separating cyclohexane from the resultant mixture by distilling in the absence of added water so that at least 50% by weight of unreacted cyclohexane is removed in non-azeotropic manner, then removing the remaining cyclohexane as an azetrope with water, and oxidizing the residual mixture, after removal of the cyclohexane, to produce adipic acid.

---

This invention relates to the isolation of oxidation products from the mixture of products obtained by oxidising cyclohexane with a gas containing molecular oxygen.

When cyclohexane is oxidised in the liquid phase with a gas containing molecular oxygen such as air at elevated temperature and pressure a mixture of oxidation products is obtained of which important constituents are cyclohexanone and cyclohexanol. In order to obtain cyclohexanone and cyclohexanol and other desirable oxidation products in good yield relative to the amount of cyclohexane which is oxidised it is usual to limit the proportion of cyclohexane which is converted or oxidised to about 8% to 10% by weight of the amount charged to the reaction vessels. Accordingly the oxidation product contains a high proportion of unchanged cyclohexane which must be separated so that it can be recirculated and again subjected to oxidising conditions.

The products from cyclohexane oxidation after removal of surplus cyclohexane are used on the large scale for the manufacture of adipic acid by further oxidation with nitric acid. Such processes are further described in U.S. Patent Nos. 2,557,282 and 2,703,331.

It has now been found that the yield of adipic acid may be influenced by the method which is adopted for removing the excess cyclohexane from the mixture of products obtained by oxidation of cyclohexane with an oxygen containing gas. Usually the unconverted cyclohexane is removed as an azetrope with water by the injection of steam into the total oxidation product.

According to the present invention we provide a process for the separation of cyclohexane from the mixture of products obtained by oxidising cyclohexane in the liquid phase at elevated temperature and pressure with a gas containing molecular oxygen comprising the steps of removing the major part of the cyclohexane by distillation in the absence of added water, and removing the remaining cyclohexane as an azetrope with water.

By this process, the yield percent of adipic acid when the residue is subjected to further oxidation with nitric acid is significantly increased.

By the term major part of the cyclohexane we mean at least 50% by weight of the cyclohexane present in the mixture. When 50% of the cyclohexane is removed non-azeotropically the yield of adipic acid obtained by further oxidation with nitric acid is increased by about 1%. We find that the yield of adipic acid increases progressively as the proportion of cyclohexane removed non-azeotropically is increased. Thus the best yields of adipic acid are obtained when all but a small percentage (e.g. 2–10%) of the cyclohexane is removed non-azeotropically. For large scale operations however it is found best to remove 85–90% of the cyclohexane non-azeotropically.

The invention is illustrated by the following examples:

Example 1.—Conventional removal of cyclohexane in the presence of water

Unconverted cyclohexane was removed from the product of air-oxidising cyclohexane until 8–10% had been converted to the other products, by distillation with steam at atmospheric pressure and at an average reflux ratio of ½:1 in the presence of sufficient added water to satisfy azeotrope formation with the unconverted cyclohexane and to leave 10% by weight of water in the cyclohexane-free product. The distillation temperature was 69–70° C. corresponding to a temperature of 75–78° C. in the still contents, during azeotrope distillation. Subsequently, the temperature of the still contents began to rise from 75–78° C. and distillation was continued until a temperature of 110° C. was reached and maintained at this temperature until top temperature began to fall. The product contained an insignificant concentration of cyclohexane and on oxidising to adipic acid with nitric acid gave 1.004 gm. of adipic acid per g. of dry product.

Example 2.—Removal of cyclohexane without the assistance of water

From a sample of the identical material used in Example 1, 97% of the unconverted cyclohexane was removed by distillation without the assistance of added water. At this stage water was added to remove the remainder of the cyclohexane as azeotrope then the distillation was completed as in Example 1. In this case, further oxidation of the product as in the previous example gave 1.039 g. adipic acid per g. of dry product, i.e. 3.5% more than in that of Example 1.

We claim:
1. A process for the manufacture of adipic acid which comprises oxidizing cyclohexane in liquid phase at elevated temperature and pressure with a gas containing molecular oxygen, separating unreacted cyclohexane from the resultant mixture by distilling in the absence of added water until at least 50% by weight of the cyclohexane has been separated non-azeotropically, then removing the remaining unreacted cyclohexane as an azeotrope with water and oxidizing the residual mixture with nitric acid to produce adipic acid.

2. Process according to claim 1 wherein from 85 to 90% by weight of the cyclohexane is separated by distillation in the absence of added water.

3. Process according to claim 1 wherein from 90 to 98% by weight of the cyclohexane is separated by distillation in the absence of added water.

References Cited

UNITED STATES PATENTS

| 3,361,806 | 2/1968 | Lidov | 260—533 |
|---|---|---|---|
| 3,340,304 | 10/1967 | Schultz | 260—531 X |
| 2,557,282 | 6/1951 | Hamblet | 260—533 |

LORRAINE A. WEINBERGER, Primary Examiner

D. STENZEL, Assistant Examiner

U.S. Cl. X.R.
260—531, 586